United States Patent [19]

Gheith

[11] Patent Number: 5,774,722
[45] Date of Patent: Jun. 30, 1998

[54] METHOD FOR EFFICIENT EXTERNAL REFERENCE RESOLUTION IN DYNAMICALLY LINKED SHARED CODE LIBRARIES IN SINGLE ADDRESS SPACE OPERATING SYSTEMS

[75] Inventor: Ahmed Mohammed Gheith, Round Rock, Tex.

[73] Assignee: International Business Machines Corporation, Armonk, N.Y.

[21] Appl. No.: 572,470

[22] Filed: Dec. 14, 1995

[51] Int. Cl.[6] ............................................. G06F 9/42
[52] U.S. Cl. ............................................. 395/685
[58] Field of Search ................................... 395/685, 710; 911/200–209

[56] References Cited

U.S. PATENT DOCUMENTS

| | | | |
|---|---|---|---|
| 4,024,504 | 5/1977 | Chowning et al. ................... | 395/652 |
| 5,369,766 | 11/1994 | Nakano et al. . | |
| 5,375,241 | 12/1994 | Walsh ................................... | 395/685 |
| 5,475,840 | 12/1995 | Nelson et al. . | |
| 5,613,120 | 3/1997 | Palay et al. ......................... | 395/710 |

*Primary Examiner*—Alvin E. Oberley
*Assistant Examiner*—R. S. Rosenholm
*Attorney, Agent, or Firm*—Mark S. Walker

[57] ABSTRACT

A system and method for resolving external references in single address space operating systems using client context based external reference resolution. The source code of a shared library module is analyzed during compilation and external references (exported variables and functions) identified. The compiler adds code to resolve the external reference based on a Global Offset Table (GOT) for each client instance of that library. The client instance maintains a global context area address register (GCR) that is combined with a library module offset value to define a real address in the single address space. Only the offset resolution code is fixed by the loader at load-time. The remaining module code is unchanged by the loader. The loader constructs a global context area for each client process as it is loaded and loads the address of that area into the Global Context Register for that process.

8 Claims, 3 Drawing Sheets

METHOD FOR EFFICIENT EXTERNAL REFERENCE RESOLUTION IN DYNAMICALLY LINKED SHARED CODE LIBRARIES IN SINGLE ADDRESS SPACE OPERATING SYSTEMS

CROSS-REFERENCE TO RELATED APPLICATIONS

The present invention is related to the applications entitled "Method for Generating an Shared Library Executable Code with Lazy Global Offset Table Address Calculation" and "Method for Eliminating Intra-Module Global Offset Table Address Computation" filed on Dec. 14, 1995 and bearing attorney docket numbers AT995-029 and AT995-030, respectively.

BACKGROUND OF THE INVENTION

1. Field of the Invention

The present invention relates to compiler technology for compiling source code programs in to programs executable on a computer system. More particularly, the present invention relates to systems and methods for causing a compiler to create executable code that efficiently resolves external data reference addresses in a shared code library.

2. Background and Related Art

Computer systems such as the IBM Risc System/6000 are able to run a large number of programs concurrently. System efficiency is improved by using libraries of shared program code that are shared by all executing programs. Shared libraries eliminate the need to include the library code in each executable program thereby reducing the size of the executable programs. Shared libraries improve memory efficiency by allowing a single copy of the library to be present in system memory rather than requiring a copy to be present for each application program that uses it.

Dynamically linked libraries are linked at run time by the application program. Each library makes certain functions and variable values available for use by application programs. These functions and values are called exported functions and exported variables of the library. At application compile time, therefore, the external references to the exported library variables are not known. The system must provide a mechanism for the application to resolve external references at run-time. Resolution of a reference is the process of determining a memory address for a referenced variable or function. The memory address allows the program to access that variable data stored at that address or to invoke the function stored at that address.

Shared libraries provide memory position independent pure code, i.e. the code of the library is not modified to account for actual loaded memory location when the library is loaded for execution. The external reference address resolution mechanism must be able to provide an address without requiring load-time modification of the base library code.

Prior art systems have solved this problem in several ways. The AIX operating system creates an exported variable table of contents (TOC) for each shared library. The TOC maps the external references of a library to memory locations. The AIX TOC for a library is adjusted at runtime to reflect the actual memory location of the library. The AIX compiler builds the TOC when the library source code is compiled.

All references to an exported variable or exported function in AIX require indirect access through the TOC. Indirect references are slower than direct references and can adversely impact performance. In addition, the TOC must always be available to the calling program. A register (typically R2) is dedicated to point to the address of the TOC by convention. The programs must always ensure that the designated register points to the correct TOC, i.e. the TOC for the library function to be accessed. The register must be modified each time a different library is accessed. All function calls in such a system are indirect. The function call first accesses a function description table (FDT). The function description table sets the designated register (e.g. R2) to point to the correct TOC and then accesses the requested function.

The disadvantage of the TOC approach is that most of the code in a program does not require external reference resolution. The TOC architecture, however, requires all references to be through the TOC whether or not they are external to the function. Thus, internal references to the exported variables are slowed by the requirement of indirect reference through the TOC.

The Sun Microsystems Solaris operating system solved the external reference problem in a different way. The Solaris operating system uses a Global Offset Table (GOT) to resolve references. The GOT is created by the compiler at a predetermined location within each library. The location is established so that the program can calculate the location of the GOT at any time thus eliminating the need to provide a register pointing to the GOT table. The GOT is placed by the compiler at the end of the library code. The program can then determine the relative location by determining where the end of the code is relative to the current position.

A shared library has the advantage that only one copy of the library code needs to be present in the computer system memory even though several programs are using that code. Multiple client programs can access the library through function calls. Each client program, however, will require an area to store its own values for the library program exported variables. For example, a shared library may have the following code segment written in C:

```
int x:
int doSomething( ) {
    if (x== 10)
        ...
    } else {
        ...
    }
}
```

The variable x is used by each client using the library. If two clients are concurrently bound to the library and each accesses x through the GOT, there must be some mechanism in the system to differentiate between the two instances of x.

Instances of x can be differentiated in a system with virtual memory management by using virtual aliases. The solution is more difficult in an operating system that operates within a single address space such as the Apple Macintosh operating system or the IBM OS/400 operating system. A single address space system is one in which all processes have identical virtual address to real address mappings. Single address space systems do not allow virtual aliases.

A technical problem therefore exists to find a system and procedure for maintaining multiple instances of exported variables of a shared library function in a single address space operating system.

SUMMARY OF THE INVENTION

The present invention is directed to a system and method for managing shared library exported variables in a single address space operating system. The present invention establishes a GOT context area in storage for each client process. Each client process maintains a register pointing to the GOT context area. The GOT context area contains a pointer to a GOT area for each shared library used by the client process. The client process is therefore able to access exported variables by using the register pointer and a known offset to the GOT pointer for a specific shared library to access the GOT for that shared library.

The present invention is directed to a computer implemented method for external reference resolution for each process referencing a shared library in an single address space operating system, the method comprising the steps of: building at load time a global offset table context area for the process being loaded; storing the address of the global offset table context at a first storage location; and assigning a global offset table area at a storage address for each of one or more shared libraries used by the process and storing the storage address at a library offset in the global offset table context.

It is therefore an object of the present invention to provide a process for resolving shared library variable references in a single address space operating system.

It is yet another object of the invention to provide a system for managing a global offset table for each shared library used by each of a plurality of client processes.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Figure 2:
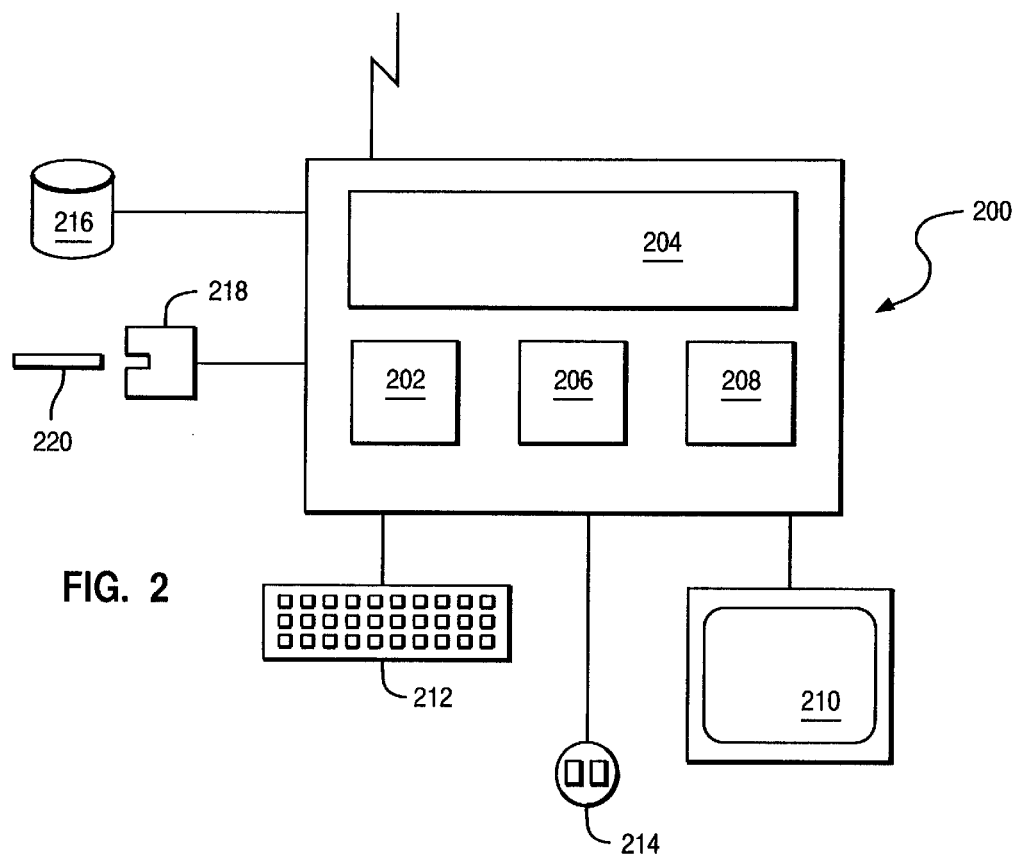
FIG. 2 is a block diagram of a computer system in which the preferred embodiment of the present invention is practiced.

The preferred embodiment of the present invention is practiced in a computer system such as that shown in FIG. 2. The computer system can be any of a number of commercially available systems such as the IBM RISC System/6000 workstation or the IBM Personal Computer workstation. The preferred embodiment requires a system 200 with a processor 202, random access memory 204, input/output controller 206 and network controller 208 for managing the communications with network resources. Processor 202 can be any of a variety of single or multiple processor packages such as the IBM PowerPC microprocessor. Input/Output controller 206 manages input/output resources including, but not limited to, a display monitor 210, a keyboard 212, a pointing device 214, permanent storage 216, and removable storage media 218, 220. Permanent and removable storage media can be any known type including magnetic disk, optical disk or magnetic/optical disks.

Figure 3:
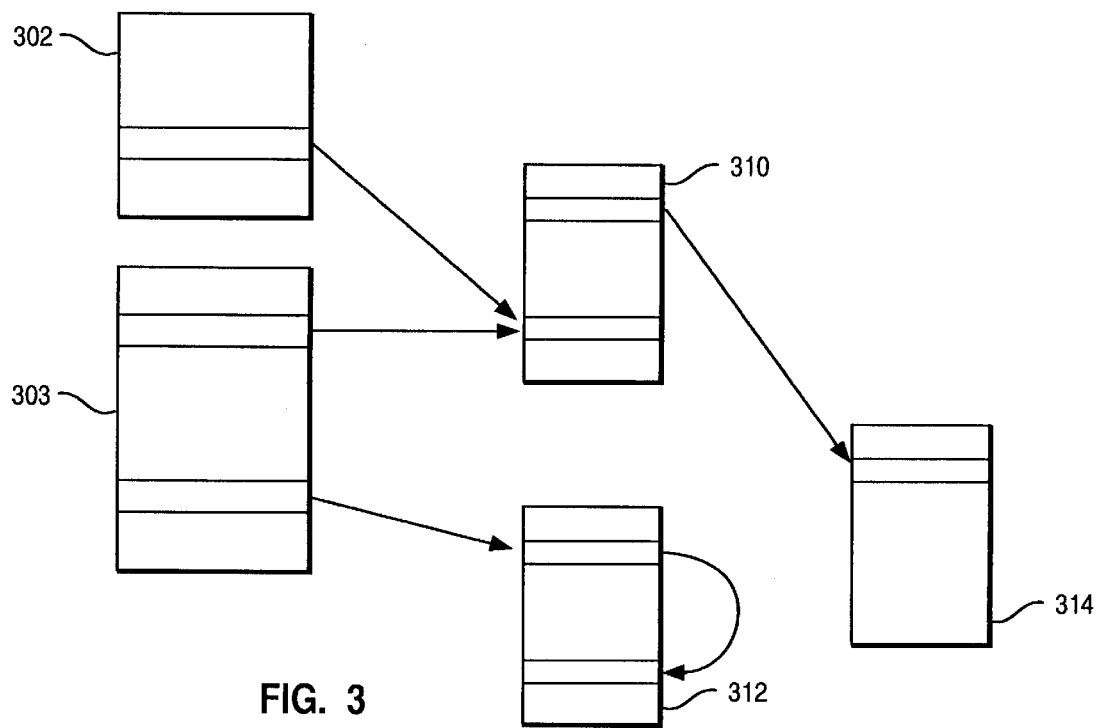
FIG. 3 is a block diagram illustrating the address references in a system according to the present invention.

Shared libraries are used by client processes as shown in FIG. 3. Client programs 302, 303 use functions in shared libraries 310, 312, 314. Although two client processes and three shared libraries are shown, it will be recognized that any number of client programs or shared libraries may be involved without departing from the spirit of the invention. A shared library is typically loaded into the system when it is first invoked by a client process. The present invention is part of the process of setting up the client process to access the shared library whether the shared library is being loaded for the first or later time.

Figure 4:
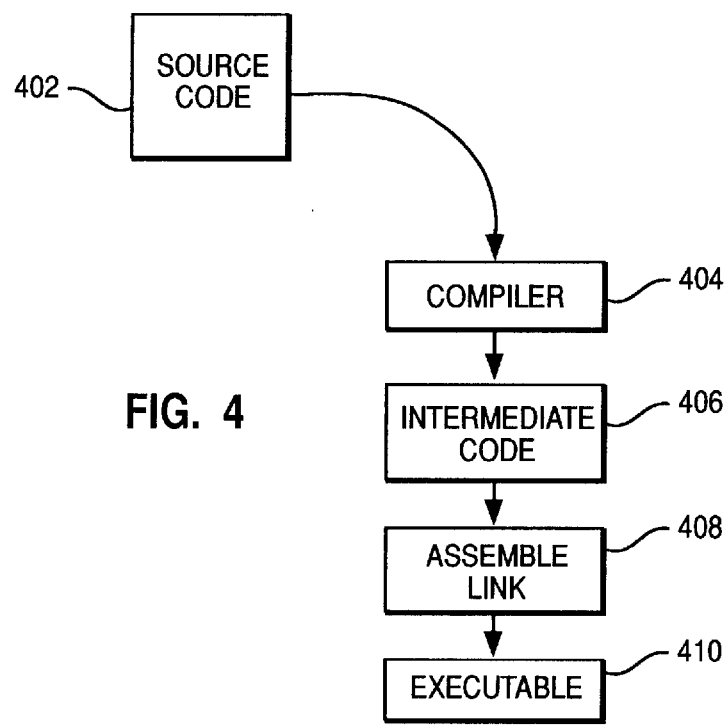
FIG. 4 is a block diagram illustrating the steps of compilation according to the present invention.
Figure 5:
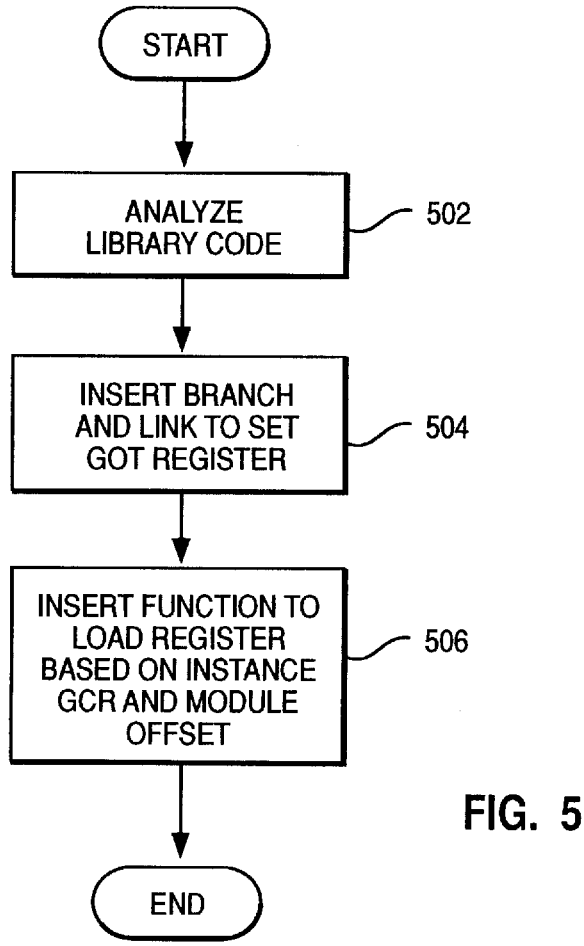
FIG. 5 is a flowchart illustrating the process of the preferred embodiment of the present invention.

The process of the present invention is implemented within a compiler program for compiling program source code into executable code. A compiler typically operates as shown in FIG. 4. Source code 402 is read by compiler 404 and transformed into a set of basic operations known to the computer system. These basic operations are typically expressed as assembly language code 406. The assembly language code 406 is assembled and linked with required object modules to form the final executable 410. The loader loads a program for execution in the computer. The loader loads the program at a specific address in memory and modifies address references within the program based on the loaded location in memory. The GOT table is modified by the loader to correctly resolve shared library external references and is used by the library functions and client processes to resolve references within the library.

The compiler 404 may include one or more passes through the code to analyze its content. During compilation, the compiler will determine whether or not the program references functions or data external to the program. The present invention is implemented in a compiler to cause that compiler to insert GOT address determination logic into client process and shared library modules. The present invention also requires that the loader create the GOT context storage areas and provide the client program with the address of the GOT context area.

The compiler is modified to add code for loading the address of the client process GOT into a specific register, for example register 31 (R31.) This is accomplished by calling a routine to determine the GOT address based on the client process GOT Context Register (GCR) and an offset for the present module within that Context Area.

The GOT Context Area contains entry for each shared library used by the client process. The entry is a pointer to the client process GOT for that library. The GOT Context Area is built by the loader at run-time with the entry for each library being placed at a specific library module offset within the GOT Context Area. As the loader loads new clients it will create GOT Context Areas for each with the currently loaded shared libraries have the same offset within each GOT Context Area. A shared library is unloaded from memory when it is not referenced by any loaded client program. The offset of the unloaded shared library is then made available for reuse by the loader.

Determining the GOT address for a client process is accomplished by using the GOT Context Register to locate the GOT Context Area for the client process and then using the library module offset to find the address for the GOT itself. Once this address is loaded in the specified register, e.g. R31, the program can access exported variables and functions in the known way through the GOT using that register as the pointer to the GOT.

Figure 1:
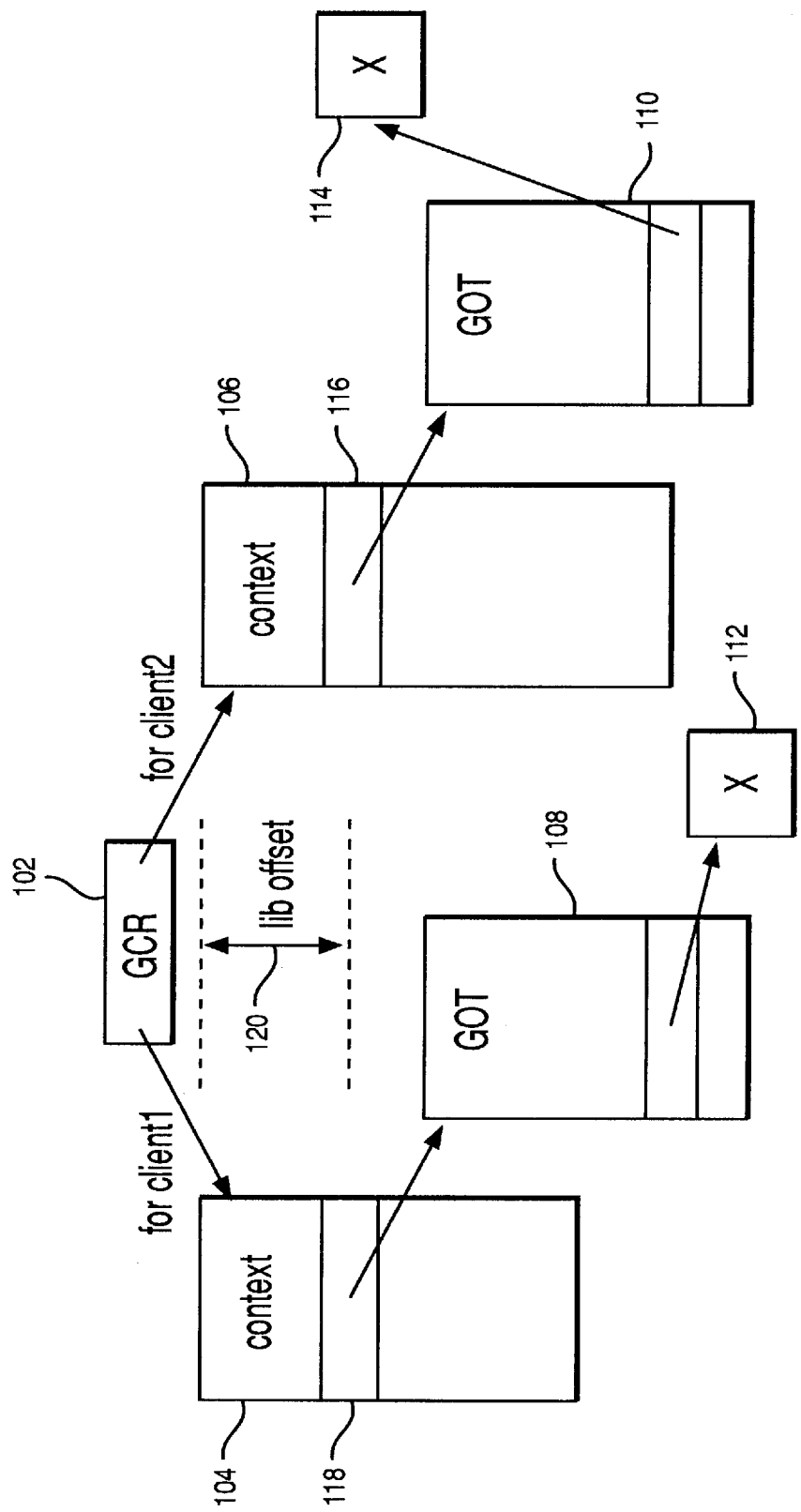
FIG. 1 is block diagram illustrating the relationships between memory areas in the preferred embodiment of the present invention.

FIG. 1 illustrates the relationship between the registers and the storage locations. GOT Context Register (GCR) 102 is defined for each process. The GCR 102 contains the address of the GOT Context Area 104 or 106 for the process. The loader created GOT Context Area has an entry at a specific library module offset 120 for the address of the client GOT for that specific library. GOT Context Area 106 is larger than GOT Context Area 104 because client2 uses more shared libraries than does client1. The offset for a particular library will remain constant at 120 for all client processes.

Pointer 118 addresses GOT 108 for client1 and pointer 116 addresses GOT 110 for client2. The two GOT areas can be at any addressable memory location so use of this scheme is supported in operating systems that have a single address space architecture. The address of external variable x is found at a constant offset into the GOT. Client 1 references its copy of x at 112, while client 2 references its copy of x at 114.

The program code for finding a module GOT pointer consists of two portions, one in the body of each function calculating the GOT pointer and one supporting function in each shared library module. The code in the function body consists of a single branch and link instruction, e.g.

```
foo:
    ...
    bl   find_got31   # load my GOT pointer into R31
    ...
```

The function to which the above code branches is:

```
find_got 31:         # one in each module
    l    r31,my_offset(GCR)   # fixed by the loader
    br
```

This code loads (1) register 31 with the contents at my_offset into the area addressed by GCR. The GCR+my_offset contains the address of the current module GOT table for this client. Once loaded, the branch returns (br) to the instruction following the branch and link (bl) instruction. The load instruction is fixed by the loader so that it contains the correct offset into the GOT Context Area.

The present invention is implemented in a compiler for transforming source code to executable object code. The steps are illustrated in FIG. The compiler first determines which variables and functions the library exports 502. These exported variables are the externally referenced variables of the client program the exported functions are those functions of the shared library called by the client program. The compiler inserts code into the module to branch and link to a function that loads a specific register (e.g. R31) with the GOT address 504. Finally, the compiler inserts 506 a function to load the register (e.g. R31) with the GOT address based on the Global Context Register (GCR) of the client process and the library offset into the Global Context Register (my_offset). The system loader must also be modified to build the Context Area, update the offset values for each library, and load the client global context register (GCR) with the Context Area address as the client process as it is loaded.

The present invention allows the client code to run without modification at run-time. The shared library code is run unchanged and shared by each client process. The shared library and client code need not consider how the GOT address is determined and can use it as though it was directly specified. The only portion of code that is modified at run-time by the loader is the find_got31 code which is modified to give the actual library module offset of the current library (my_offset) in the GOT Context Area.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

I claim:

1. A computer implemented method for determining a memory address of a library element in one of a plurality of shared libraries external to a client program executing in one of a plurality of processes, wherein each process references a plurality of shared libraries and said plurality of processes are executing in an operating system that manages memory as a single address space memory, the method comprising the steps of:

building at process load time a separate global offset table context area at an address for each said process as it is being loaded for execution;

storing the address of said global offset table context area at a first storage location;

for each process, assigning a client global offset table area at a storage address for each of said plurality of shared libraries containing a library element referenced by said process and storing the client global offset table area storage address at a library offset in said global offset table context area, said library offset remain constant for all processes.

2. The method of claim 1, further comprising the steps of;

resolving a reference from an executing process to a shared library element by determining a client global offset table address from said first storage location and said library offset for the referenced library; and locating the address of said referenced library element in said client global offset table area.

3. The method of claim 2, wherein the step of resolving a reference from an executing process to a shared library element comprises the steps of:

retrieving said global offset table context area storage address from said first storage location; and retrieving the client global offset table area address at said library offset into said global offset table context area.

4. A computer program product having a computer readable medium having computer program logic recorded thereon for resolving references from an executing process to a library element in one of a plurality of shared libraries in a computer system in which memory is managed as a single address space, said computer program product comprising:

computer program product means for causing a computer system to build at process load time a separate global offset table context area at an address for each of a plurality of processes as it is being loaded for execution;

computer program product means for causing a computer system to store said address of the global offset table context area at a first storage location;

computer program product means for causing a computer system to assign a client global offset table area for each process at a storage address for each of said plurality of shared libraries containing a library element referenced by said process and storing the client global offset table area storage address at a library offset in said global offset table context area, said library offset remaining constant for all processes.

5. The computer program product of claim 4, further comprising:

computer program product means for causing a computer system to resolve a reference from an executing process to a shared library element by determining a client global offset table address from said first storage location and said library offset for the referenced library; and computer program product means for causing a computer system to locate the address of said referenced library element in said client global offset table area.

6. The computer program product of claim 5, wherein the computer program product means causing a computer system to resolve a reference from an executing process to a shared library element comprises:

computer program product means for causing a computer system to retrieve said global offset table context area storage address from said first storage location; and computer program product means for causing a computer system to retrieve said client global offset table area storage address at said library offset into said global offset table context area.

7. A system for resolving references from an executing process to a library element in one of a plurality of shared libraries, said process executing in a single address space computer system, the system comprising:

means for constructing a separate global offset table context area for each client process when said process is loaded for execution;

means for allocating at a storage address a client process global offset table data storage area for each shared library containing a library element referenced by said client process, said storage address being stored in said global offset table context area at a library offset; and means for locating a shared library element referenced by a client process by locating said global offset table context area for said client process and said global offset table address for said shared library.

8. The system of claim 7, wherein the means for locating a shared library element includes:

means for branching to a global offset table address calculation routine; and means for calculating said global offset table address from a global offset table context area address and said library offset into said global context area.

* * * * *